FIP8102 OR 3,189,822 SEARCH ROOM
KS
X582SD
X51867
June 15, 1965 MASASUKE MORITA ET AL 3,189,822
SWITCHOVER ARRANGEMENT IN A MOBILE RADIO COMMUNICATION SYSTEM
Filed Aug. 1, 1962
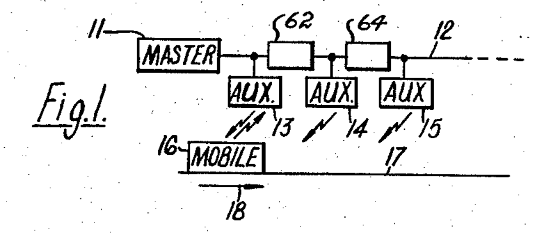
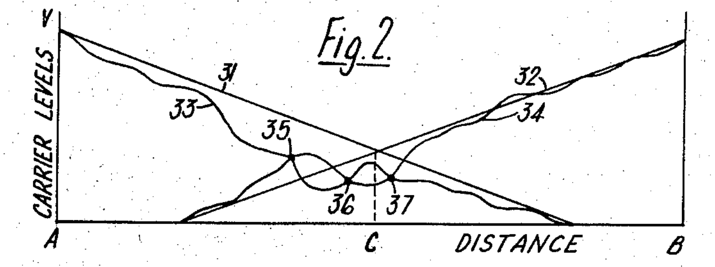
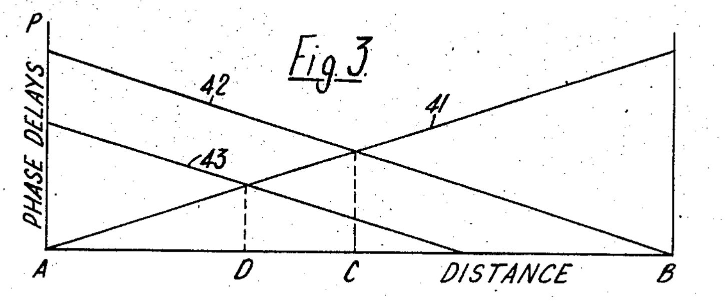
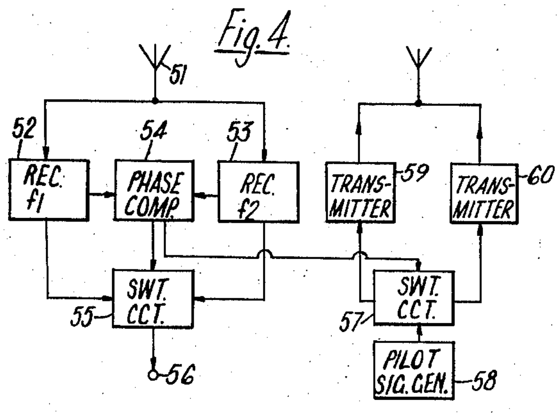
Inventors
M. Morita-T. Kuroda
by Arthur M. Lieberman
agent United States Patent Office 3,189,822

Patented June 15, 1965

3,189,822

SWITCHOVER ARRANGEMENT IN A MOBILE RADIO COMMUNICATION SYSTEM

Masasuke Morita and Takaji Kuroda, Tokyo, Japan, assignors to Nippon Electric Company Limited, Tokyo, Japan, a corporation of Japan Filed Aug. 1, 1962, Ser. No. 214,013
Claims priority, application Japan, Aug. 7, 1961, 36/28,583
6 Claims. (Cl. 325—4)

This invention relates to a mobile radio communication system having a fixed master or terminal station, and a plurality of fixed repeating stations, connected (by wire or radio link) in series or parallel therewith, disposed along the route of a vehicle to be communicated with. In particular the invention relates to a switchover arrangement for ensuring radio contact between the vehicle and a predetermined one of the fixed repeaters at any one time.

Communication between a vehicle such as an automobile, train, airplane, or the like and fixed point is not ordinarily performed directly between the fixed station and the mobile station carried by such a vehicle. Rather it is usually carried out indirectly via a fixed communication route connecting the master station and a plurality of relatively small auxiliary or repeater stations, with one of which the mobile station is in contact. In such a system, the auxiliary stations are scattered at distances determined by the output powers thereof and by the topography of the path. These stations are generally allotted different carrier frequencies to avoid fading and time lag phenomena which would otherwise occur from the multipaths and overreach of the signals received by the mobile station. Additionally, the reception of a signal transmitted from the mobile station and received by two or more auxiliary stations would cause distortion at the master station because of the time differences in arrival. Therefore, a mobile station must communicate with only one auxiliary station at a time, and consequently select, as it travels along, the one to communicate with. Generally the carrier frequency of an auxiliary station and the tuning frequency of the receiver provided therein are made somewhat different from those of adjacent stations; while the frequencies of the transmitter-receiver in the mobile station are switched over from one to another, during travel thereof, in conformity with those of the participating auxiliary station.

Conventionally the amplitude levels of the carriers received from two auxiliary stations are compared by the mobile station, travelling therebetween, so that the switchover to the station which lies ahead may be effected. Usually this occurs at the point in time when the levels are equal, usually at the midpoint between the two auxiliary stations. This arrangement has disadvantages, however, in that mis-operation often results from changes in the received carrier amplitude levels which occur by virtue of the nonuniform variability of amplitude with distance because of standing waves.

In order to obviate such defects, it has been proposed to dispose oscillators of a specific frequency at the midpoints between neighboring auxiliary stations, and to make the switchover device in the mobile station dependent upon the reception of these oscillations. With this method, however, there is the disadvantageous cost and maintenance of additional equipment at additional locations. Furthermore, the mobile station must be provided with an additional receiver for the output of such oscillators.

It has also been proposed to replace the oscillators with pieces of isotope to make use of the radioactive rays radiated therefrom for controlling the switchover operation in the mobile station. This method is beset with many problems, however, including false triggering by natural isotopes and those possessed by others, and governmental regulations and safety precautions.

Hence it is the object of this invention to provide an improvement switchover arrangement for a mobile radio communication system wherein the above-mentioned disadvantages are obviated.

The above-mentioned and other features and objects of this invention and the manner of attaining them will become more apparent and the invention itself will be best understood by reference to the following description of an embodiment of the invention taken in conjunction with the accompanying drawings in which:

FIG. 1 is a block diagram of a mobile radio communication system to which the invention is applicable.

FIG. 2 is a group of curves for explaining the principles of a conventional switchover arrangement.

FIG. 3 is a group of curves illustrating the principles of a switchover arrangement according to the invention.

FIG. 4 shows an example of a transmitter-receiver, carried by a mobile station, in accordance with the invention.

In FIG. 1 may be seen a mobile communication system consisting of a master station 11, and auxiliary stations 13, 14, and 15 which are situated along a path 17, of mobile station 16. The fixed stations are connected together by a cable 12. The distances, dependent upon the output powers of the respective auxiliary stations and upon the topography of the path, must be such that the transmitted output levels of two neighboring auxiliary stations are large enough for reception by a mobile station travelling midway between them. The mobile station 16, as it travels along the path in the direction of an arrow 18, communicates first with the auxiliary station 13, next with the auxiliary station 14, and then with the auxiliary station 15.

When the mobile station has reached the midpoint between two auxiliary stations, communication must be switched, without delay, from the first auxiliary station (for example 13) with which it has been communicating to the next auxiliary station (14).

Turning to FIG. 2, the abscissa represents the distance between auxiliary stations 13 and 14 (located at points A and B respectively) and the ordinates, the carrier wave levels, V, which are receivable by a mobile station travelling therebetween. In an ideal case these carrier levels will decrease uniformly (as shown by straight lines 31 and 32) in conformity to the respective distances from the auxiliary stations. Where the decrease is ideal, it is possible at the mobile station, by comparing the levels of the received carrier waves, to effect the switchover when the levels are equal, or in other words where the uniform curves 31 and 32 intersect. The levels of the two carrier waves, however, will vary irregularly as shown in exaggerated form by curves 33 and 34, because of variations in the levels actually sent out at the auxiliary stations, interferences in the propagating waves, noise, and the like. Such irregular curves intersect more than once, for example, at points 35, 36, 37, so that errors are introduced in the switchover operation. In summary, the aforementioned defects are inherent in conventional arrangements where the information for switching over is obtained by comparing the carrier wave amplitude levels.

In contrast, the switchover arrangement of the invention provides the auxiliary stations with means for sending out respective pilot signals of the same phase to provide the mobile station with a more sure means of comparison. As illustrated by the straight lines 41 and 42 in FIG. 3 which shows, the distance between the auxiliary stations 13 and 14 as the abscissa and the phase delays P as the ordinate, the phases of the pilot signals vary linearly with respect to distance without the irregularities previously present with the amplitude levels. It is therefore possible to obtain superior results as compared to the conventional arrangement described above.

In order to make the transmitted phases of the pilot signals from the respective auxiliary stations equal, delay lines, 62 and 64, are provided between neighboring pairs of auxiliary stations. The delay time of these lines must conform to the distances between neighboring stations. Of course, delay lines are not the only method of insuring phase coincidence. Several methods known in the art are available; and the equipping of the auxiliary stations to receive and appropriately delay a master pilot signal, or pilot signal generators dependent for phase upon a common A.C. power source, are further examples.

In special situations the phases of the pilot signals may be made unequal so that the equal delay point C is available at other than the distance midpoint between stations. Equal phase delay may occur at point D along line 43, for example.

FIG. 4 shows a mobile station for use in accordance with the invention. The signals sent out together with the pilot signals from the two neighboring auxiliary stations 13 and 14, for example, are received by a parabolic antenna 51, and are selected, amplified, and detected at a receiver 52 of frequency $f_1$, for auxiliary station 13's frequency $f_1$, and by another receiver 53 for receiving the signal $f_2$ from the auxiliary station 14. The detected pilot signals at 12 kc., for example, are selected by respective filters within the receivers and are supplied to a phase comparator 54. The comparator may be any of the well-known types capable of controlling a switching circuit by the lead-lag contingencies of its incident signal phases (e.g., positive, negative or zero output depending upon the phase difference). The output of the comparator 54 in turn is applied to switching circuit 55 composed of relays, vacuum tubes or solid state devices, for supplying therethrough either of the outputs of the receivers 52 and 53 to an output terminal 56. If necessary, to notify the auxiliary stations concerned of the completion of the switchover, the output of the comparator 54 may also be applied to another switching circuit 57 for letting the output of a pilot signal source 58 pass therethrough to either of the transmitters 59 and 60.

Although FIG. 4 shows two transmitters in the mobile station, one transmitter whose output frequencies can be switched in accordance with the output of the switching circuit will also suffice. Moreover, where the mobile station transmits on only one frequency this duality of transmission frequencies can obviously be eliminated.

As has been described, the information for switching over the participant auxiliary station is obtained, according to the invention, by continuously comparing, at the mobile station, the phases of the pilot signals included in the information transmitted by the respective auxiliary stations. The invention can therefore substantially eliminate the aforementioned defects which were inevitable in the conventional switchover arrangement.

While we have described above the principles of our invention in connection with specific apparatus, it is to be clearly understood that this description is made only by way of example and not a limitation to the scope of our invention, as set forth in the objects thereof and in the accompanying claims.

What is claimed is:

1. In a mobile radio communication system having a fixed terminal station and a plurality of connected fixed repeater stations disposed along the route of a mobile station for effecting a radio link for transmission between the terminal and mobile stations, the mobile station successively communicating directly wtih one repeater station at a time as it moves along the path, the improvement therein for effecting the said successive communication comprising means for transmitting a pilot signal from each repeater station, each pilot signal having a predetermined phase relationship to the pilot signal of a neighboring repeater station; receiving means in said mobile station comprising two receivers respectively receiving the transmitted signals from different ones of the two repeater stations which are nearest said mobile station and selection means for selecting one of said received signals to be the output of said receiving means, said selection means including detection means for detecting the pilot signals in the received signals, comparing means connected to said detection means for comparing the phases of the detected pilot signals and effecting a comparison result, and switch means connected to said comparing means and responsive to a predetermined comparison result for switching the output of said receiving means to be one instead of the other of said received signals.

2. A mobile radio communication system comprising:

(A) first and second spaced apart fixed transmitters,
  (1) said transmitters including means for transmitting pilot signals which have a predetermined phase relationship to each other, said phase relationship being selected such that an unambiguous phase relation exists between said pilot signals at each point between said transmitters;

(B) receiver means carried by a vehicle traveling along a route between said transmitters, said receiver means including:
  (1) a separate receiver for receiving the signals transmitted from each of said transmitters;
  (2) selection means for selecting only one of said received signals to be the output of said receiving means, said selecting means including:
    (a) detecting means for detecting both pilot signals,
    (b) comparing means connected to said detecting means for comparing the phases of the detected pilot signals and producing comparison output signals representative of said comparison, and
    (c) switch means connected to said comparing means for switching the output of said receiving means to be one instead of the other of said received signals in response to a preselected comparison output signal.

3. A mobile radio communication station as set forth in claim 2 wherein said receiver means further includes transmitting means responsive to said comparing means for transmitting a signal to said fixed transmitters for indicating that switchover has occurred.

4. A mobile radio communication station as set forth in claim 2 wherein the phase relation between said pilot signals is predetermined in accordance with both the distance between said fixed transmitters and a preselected point at which switchover is desired.

5. A mobile radio communication station as set forth in claim 2 wherein said fixed transmitters are two of a plurality of repeater stations disposed along the route of travel of said vehicle and wherein said repeater stations each repeat signals received from a terminal station.

6. A mobile radio communication station as set forth in claim 5 wherein said repeater stations are interconnected by a delay line, said delay line providing predetermined delays to the pilot signals supplied to successive stations along said route.

References Cited by the Examiner

UNITED STATES PATENTS

| | | | |
|---|---|---|---|
| 1,922,059 | 8/33 | Ohl | 325—304 |
| 2,734,131 | 2/56 | Magnuski | 325—56 |

DAVID G. REDINBAUGH, *Primary Examiner.*